US005773128A

United States Patent [19]

Obata et al.

[11] Patent Number: 5,773,128

[45] Date of Patent: Jun. 30, 1998

[54] METHOD FOR FORMING POROUS FILM IN THERMAL TRANSFER RECORDING MEDIUM, METHOD FOR PREPARING THERMAL TRANSFER RECORDING MEDIUM, AND THERMAL TRANSFER RECORDING MEDIUM

[75] Inventors: Yoshiyuki Obata; Yoshihide Kaneshiro; Tomohiro Shinohara, all of Osaka, Japan

[73] Assignee: Fujicopian Co., Ltd., Osaka, Japan

[21] Appl. No.: 520,486

[22] Filed: Aug. 29, 1995

[30] Foreign Application Priority Data

Aug. 30, 1994 [JP] Japan .................................... 6-205243

[51] Int. Cl.[6] ................................ B32B 3/00; B41M 3/12

[52] U.S. Cl. .......................... 428/195; 427/146; 427/261; 427/407.1; 427/144; 347/217; 428/212; 428/484; 428/488.4; 428/913; 428/914; 428/532

[58] Field of Search ................................ 427/146, 407.1, 427/411, 261; 428/195, 212, 484, 488.4, 913, 914, 532; 347/217

[56] References Cited

U.S. PATENT DOCUMENTS 3,663,278 5/1972 Blose et al. ............................ 427/146

5,183,697 2/1993 Ide et al. ................................ 428/195

*Primary Examiner*—Janyce Bell

*Attorney, Agent, or Firm*—Fish & Neave

[57] ABSTRACT

A method is provided for forming a porous film having desired average pore diameter and pore density in a multi-printing-adaptive thermal transfer recording medium having a foundation, a heat-meltable ink layer formed on one side of the foundation and the porous film provided in the heat-meltable ink layer at a location proximate to a surface thereof, which method comprises the steps of: coating the heat-meltable ink layer with a W/O emulsion containing as an essential ingredient thereof at least one resin selected from the group consisting of cellulose acetate, cellulose acetate propionate, cellulose acetate butyrate, ethyl cellulose, nitrocellulose and ethyl hydroxyethyl cellulose; and drying the resultant coating to form a porous film.

12 Claims, 1 Drawing Sheet

METHOD FOR FORMING POROUS FILM IN THERMAL TRANSFER RECORDING MEDIUM, METHOD FOR PREPARING THERMAL TRANSFER RECORDING MEDIUM, AND THERMAL TRANSFER RECORDING MEDIUM

BACKGROUND OF THE INVENTION

The present invention relates to a method for preparing a thermal transfer recording medium and, more particularly, to a method for forming a porous film in a multi-printing-adaptive thermal transfer recording medium having the porous film proximate to a surface of a heat-meltable ink layer thereof.

Some thermal transfer recording media for use in a thermal transfer printer provide for multi-printing adaptivity, that is, portions thereof can be repeatedly used for thermal printing. One type of such thermal transfer recording media achieves the multi-printing adaptivity by providing a porous film in proximity to the surface of a heat-meltable ink layer thereof to allow melted ink to exude through the porous film in thermal transfer printing.

The prior art has proposed a variety of methods for forming such a porous film in a thermal transfer recording medium. Japanese Unexamined Patent Publication No. 2-20388 (1990), for example, discloses a method for forming a porous film from a water-in-oil emulsion of a polyurethane resin. In accordance with this method, the emulsion is applied onto a heat-meltable ink layer, then allowed to gel by applying heat thereto at 80° C. for two minutes and then at 125° C. for two minutes, followed by aging at 50° C. for three days. Thus, this method requires a prolonged drying period and an increased production cost.

Another method disclosed in Japanese Unexamined Patent Publication No. 3-215093 (1991) employs a solution containing a resin dissolved in a solvent mixture of a high boiling-point solvent and a low boiling-point solvent. Still another method disclosed in Japanese Unexamined Patent Publication No. 3-215093 (1991) employs a foaming agent to form a porous resin layer. These methods suffer from a difficulty in controlling the pore diameter and pore density to desired levels.

In multi-printing-adaptive thermal transfer recording media, the amount of heat-meltable ink to be transferred by one printing operation is greatly influenced by the pore diameter and pore density of the porous film provided in proximity to the surface of the heat-meltable ink layer and, hence, the optical density of printed images and the number of times that the same position of the recording medium can be used for printing are greatly affected thereby. It is, therefore, essential to ensure stable formation of a porous film having a pore diameter and pore density as designed.

In view of the foregoing, it is an object of the present invention to provide a method for forming a porous film which is capable of controlling the pore diameter and pore density of the porous film as designed.

It is another object of the present invention to provide a method for preparing a multi-printing adaptive thermal transfer recording medium which can be used multiple times for obtaining printed images having a desired density.

The foregoing and other objects of the present invention will be apparent from the following detailed description.

SUMMARY OF THE INVENTION

In accordance with a first aspect of the present invention, there is provided a method for forming a porous film in a thermal transfer recording medium having a foundation, a heat-meltable ink layer provided on one side of the foundation with an optional adhesive layer interposed therebetween, and the porous film provided in proximity to the surface of the heat-meltable ink layer, the method including the steps of: coating the heat-meltable ink layer with a water-in-oil (hereafter "W/O") emulsion containing as an essential ingredient thereof at least one resin selected from the group consisting of cellulose acetate, cellulose acetate propionate, cellulose acetate butyrate, ethyl cellulose, nitrocellulose and ethyl hydroxyethyl cellulose; and drying the resultant coating to form a porous film.

In accordance with a second aspect of the present invention, there is provided a method for preparing a thermal transfer recording medium, including the steps of: forming a heat-meltable ink layer on one side of a foundation with an optional adhesive layer interposed therebetween; coating the heat-meltable ink layer with a W/O emulsion containing as an essential ingredient thereof at least one resin selected from the group consisting of cellulose acetate, cellulose acetate propionate, cellulose acetate butyrate, ethyl cellulose, nitrocellulose and ethyl hydroxyethyl cellulose and drying the resultant coating to form a porous film; and heating the heat-meltable ink layer to a temperature not lower than the softening point of the heat-meltable ink layer to allow the porous film to sink down into a surface portion of the heat-meltable ink layer.

In accordance with a third aspect of the present invention, there is provided a thermal transfer recording medium prepared by the method in accordance with the second aspect of the present invention.

DETAILED DESCRIPTION OF THE PREFERRED EMBODIMENTS

The present invention will now be described in detail with reference to the attached drawings.

Figure 1:
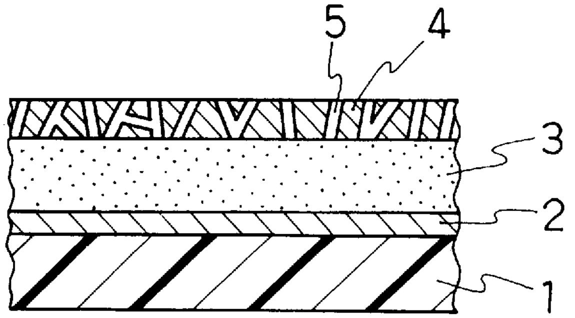
FIG. 1 is a schematic sectional view illustrating an intermediate product of a thermal transfer recording medium prepared by one exemplary method for preparing a thermal transfer recording medium according to the present invention.

In FIG. 1, there is shown an intermediate product of a thermal transfer recording medium of the present invention, which includes a foundation 1, an adhesive layer 2 and a heat-meltable ink layer 3 successively formed on the foundation 1 in this order, and a porous film 4 formed on the ink layer 3.

Figure 2:
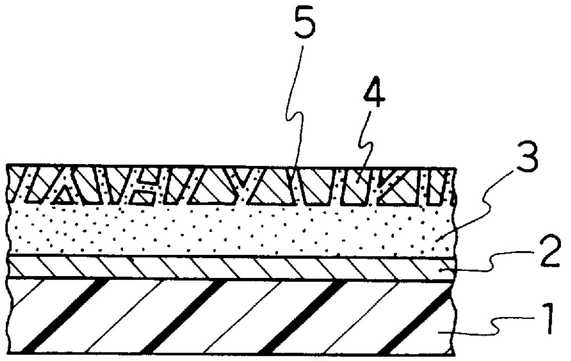
FIG. 2 is a schematic sectional view illustrating a finished product of the thermal transfer recording medium prepared by the method according to the present invention.

The heating of the intermediate product shown in FIG. 1 allows pores 5 of the porous film 4 to be filled with the heat-meltable ink and, thereby, sinks the porous film 4 into a surface portion of the heat-meltable ink layer 3. Thus, a finished product of the thermal transfer recording medium as shown in FIG. 2 is provided.

An explanation of a method for forming the porous film will be given first.

As the resin component of a W/O emulsion used in the formation of the porous film in the present invention, one or more resins are selected from the group consisting of cellulose acetate, cellulose acetate propionate, cellulose acetate butyrate, ethyl cellulose, nitrocellulose and ethyl hydroxyethyl cellulose.

It has been found that a stable W/O emulsion including an aqueous phase having a predetermined diameter can be provided by employing the aforesaid specific resin and appropriately selecting emulsification conditions such as the ratio of an aqueous phase to an oil phase containing the resin dissolved therein, the kind of an emulsifier to be used, and the like. A porous film having a pore diameter and pore density as designed can be formed by coating a heat-meltable ink layer with such a W/O emulsion and drying the resulting coating.

The W/O emulsion is prepared in the following manner. The aforesaid specific resin is dissolved in an organic solvent which is immiscible or poorly miscible with water. The content of the resin is preferably 3 to 10 parts by weight relative to 100 parts by weight of the organic solvent in order for the resultant solution to have a suitable viscosity for the preparation of the W/O emulsion, which content depends on the kind of the resin to be used. If the content of the resin is lower than the aforesaid range, the resultant emulsion is prone to be unstable. On the other hand, if the content of the resin is higher than the aforesaid range, the resultant emulsion has a higher viscosity than that required to ensure a satisfactory coating characteristic. To facilitate the dissolution of the resin, a mixture of the resin and organic solvent may be subjected to stirring by means of a stirrer and/or heating. For the formation of the porous film, the organic solvent needs to evaporate more rapidly than water. In this respect, an organic solvent having a boiling point of not higher than 90° C. is preferably used. A particularly preferable example of the organic solvent is methyl ethyl ketone (boiling point: 79.6° C.).

An emulsifier is dissolved in water. The content of the emulsifier is preferably 1 to 5 parts by weight relative to 100 parts by weight of water. If the content of the emulsifier is out of the aforesaid range, the resultant emulsion is less stable, and is liable to disintegrate. To facilitate the dissolution of the emulsifier, a mixture of the emulsifier and water may be subjected to stirring by means of a stirrer and/or heating. The emulsifier is appropriately selected from W/O emulsifiers such as polyglycerol fatty acid esters, polyethylene glycol fatty acid esters, and polyoxyethylene-polyoxypropylene alkyl ethers.

The resin solution is mixed with the aqueous solution containing the emulsifier dissolved therein, and stirred with a stirrer for emulsification. The mixing weight ratio of the aqueous solution to the resin solution preferably ranges between 1:9 and 4:6, in which the proportion of the aqueous solution is relatively small. As the mixture is continuously stirred, fine aqueous particles appear in the resin solution, and the mixture becomes emulsified. Thus, a stable W/O emulsion is obtained. The average diameter of the aqueous particles in the emulsion is preferably 0.1 to 15 μm, depending on the intended average diameter of pores to be formed in the porous film.

The W/O emulsion thus prepared is applied onto the heat-meltable ink layer by means of a suitable coating machine, and then dried. The W/O emulsion may readily be dried at a temperature of 40° to 70° C. by means of a hot dryer. There is no need to age the resultant porous film under heat after the drying. Thus, the porous film is obtained. The coating amount of the porous film (on a dried amount basis, hereinafter the same) is preferably 0.1 to 1.5 g/m$^2$. If the coating amount is less than 0.1 g/m$^2$, the amount of the heat-meltable ink to be .transferred is hard to control, and there is a danger that the porous film is broken during the thermal transfer of ink. On the other hand, if the coating amount of the porous film is greater than 1.5 g/m$^2$, the heat-meltable ink is hard to exude through the porous film, resulting in printed images with a low density.

In view of the control of amount of the heat-meltable ink to be transferred by one printing operation in order to ensure the multi-printing adaptivity, the porous film preferably has an average pore diameter of 0.1 to 10 μm in a surface portion thereof and an average pore density of $1.2\times10^6$ to $1.0\times10^9$/cm$^2$ in a surface portion thereof.

In turn, the porous film is allowed to sink into a surface portion of the heat-meltable ink layer, so that the pores of the porous film are filled with the heat-meltable ink. This ensures that printed images have the desired density from the first printing. The sink-down of the porous film is achieved by a heat treatment at a temperature not lower than the softening point of the heat-meltable ink and lower than the softening point of the resin forming the porous film. The temperature of the heat treatment is typically 60° to 90° C. Exemplary heating means include a hot roll. Thus, the intended thermal transfer recording medium is prepared.

The W/O emulsion prepared from the selected ingredients with the suitable mixing ratio under the proper conditions by the method of the present invention contains water particles of a particle diameter as designed with a density as designed, and is stable for storage. The water particles form pores in the porous film when the W/O emulsion is applied on the heat-meltable ink layer and dried. Since the water particles of a predetermined average particle diameter exist in a predetermined density in the W/O emulsion, the resultant porous film has pores of a predetermined pore diameter in a predetermined pore density. When the thus obtained thermal transfer recording medium having the porous film sinking into the heat-meltable ink layer is repeatedly used for printing, printed images of a density not lower than a given level from the first printing can be obtained multiple times.

In the present invention, the adhesive layer to be provided as required comprises a resin as a principal component. Examples of such resins include polyurethane resins, ethylene-vinyl acetate copolymer, vinyl chloride-vinyl acetate copolymer, ethylene-acrylate copolymer, polyamide resins, polyethylene, polyester resins and petroleum resins. A small amount of a wax may be added to the resin as required. Further, a particulate matter such as carbon black may be blended to provide a rough texture to the surface of the adhesive layer for increased adhesiveness to the heat-meltable ink layer.

The adhesive layer is formed by dissolving or dispersing the aforesaid ingredients in an organic solvent, coating the foundation with the resultant coating liquid and drying the coating. The coating amount of the adhesive layer is suitably about 0.3 to about 1.5 g/m$^2$. Where the adhesiveness between the heat-meltable ink layer and the foundation is sufficient, the adhesive layer need not be provided.

In the present invention, the ink constituting the heat-meltable ink layer comprises a coloring agent and a heat-meltable vehicle. Since the ink, when in a melted state, is required to exude through the porous film, the ink preferably has relatively low melting point and low melt viscosity. The melting point thereof is preferably 40° to 90° C., and the melt viscosity thereof is preferably 10 to 1,000 cps/90° C.

The vehicle includes as a main component a wax or a mixture of a wax and a heat-meltable resin.

Examples of such waxes include natural waxes such as haze wax, bees wax, carnauba wax, candelilla wax, montan wax and ceresine wax; petroleum waxes such as paraffin wax and microcrystalline wax; synthetic waxes such as oxidized wax, ester wax, polyethylene wax, Fischer-Tropsch wax and a-olefin-maleic anhydride copolymer wax; higher fatty acids such as myristic acid, palmitic acid, stearic acid and behenic acid; higher aliphatic alcohols such as stearyl alcohol and docosanol; esters such as higher fatty acid monoglycerides, sucrose fatty acid esters and sorbitan fatty acid esters; and amides and bisamides such as stearic acid amide and oleic acid amide. These waxes may be used either alone or as a mixture.

To improve the adhesiveness of the ink to receiving paper, the heat-meltable resin is preferably a tackifier resin. Examples of such tackifier resins include petroleum resins (such as polymers of $C_5$ aliphatic hydrocarbons, $C_5$ alicyclic hydrocarbons, or derivatives thereof, and polymers of $C_9$ aromatic hydrocarbons, $C_9$ alicyclic hydrocarbons, or derivatives thereof), phenol resins, acrylic resins, styrene resins, copolymers of styrene and acrylic monomer, rosin resins, pinene resins, coumarone-indene resins, and copolymer resins of these resins. These resins may be used either alone or as a mixture.

Other examples of usable heat-meltable resins (including elastomers) include olefin copolymers such as ethylene-vinyl acetate copolymer and ethylene-acrylate copolymer, polyamide resins, polyester resins, epoxy resins, polyurethane resins, acrylic resins, vinyl chloride resins, cellulosic resins, vinyl alcohol resins, styrene resins, vinyl acetate resins, natural rubber, styrene-butadiene rubber, isoprene rubber, chloroprene rubber, polyisobutylene and polybutene. These resins may be used either alone or as a mixture.

Usable as the coloring agent are those conventionally used for heat-meltable inks of this type, and examples thereof include various organic and inorganic pigments such as carbon black, and dyes.

An exemplary mixing ratio of the aforesaid ingredients of the heat-meltable ink layer is shown below.

| Ingredients | % by weight |
|---|---|
| Wax | 20 to 90 |
| Tackifier resin | 0 to 20 (preferably 5 to 20) |
| Other heat-meltable resin | 0 to 40 |
| Coloring agent | 5 to 40 |

To ensure satisfactory multi-printing adaptivity of the thermal transfer recording medium, the coating amount of the heat-meltable ink layer is preferably 4 to 7 g/m$^2$.

Useful as the foundation are polyester films such as polyethylene terephthalate film, polyethylene naphthalate film and polyarylate film, polycarbonate film, polyamide films, aramid films and other various plastic films commonly used for the foundation of ink ribbons of this type. Otherwise, thin paper sheets of high density such as of condenser paper may be used. The thickness of the foundation is preferably about 1 to about 10 $\mu$m, more preferably about 2 to about 7 $\mu$m, in view of ensuring good heat conduction.

On the back side (the side adapted to come into slide contact with a thermal head) of the foundation may be formed a conventionally known stick-preventive layer comprising one or more of various heat-resistant resins such as silicone resins, fluorine-containing resins, nitrocellulosic resin, other resins modified with these heat-resistant resins including silicone-modified urethane resins and silicone-modified acrylic resin, and mixtures of the foregoing heat-resistant resins and lubricating agents.

The present invention will be more fully described by way of Examples and Comparative Examples thereof. It is to be understood that the present invention is not limited to these Examples, and various changes and modifications may be made in the invention without departing from the spirit and scope thereof.

EXAMPLES 1 TO 4 AND COMPARATIVE EXAMPLES 1 AND 2

Formation of Adhesive Layer

A resin component of the following ingredients was homogeneously dissolved in a solvent, and carbon black and dispersant were added to and homogeneously dispersed in the solution to prepare a coating solution.

| Ingredients | Parts by weight |
|---|---|
| Polyurethane resin | 73 |
| Carbon black | 25 |
| Pigment dispersant | 2 |
| Methyl ethyl ketone | 100 |

The coating solution was applied on one side of a 4.5 $\mu$m-thick polyethylene terephthalate film provided with a silicone-based stick-preventive layer in a coating amount of 0.2 g/m$^2$ on the other side thereof, and dried to form an adhesive layer in a coating amount of 0.5 g/m$^2$.

Formation of Heat-Meltable Ink Layer

A mixture of the following ingredients was thoroughly kneaded by means of three hot rolls to prepare a heat-meltable ink. The heat-meltable ink was applied onto the adhesive layer by means of a hot melt coater. Thus, a heat-meltable ink layer having a melting point of 68° C. and a melt viscosity of 91 cps/90° C. was formed on the adhesive layer in a coating amount of 5.5 g/m$^2$.

| Ingredients | Parts by weight |
|---|---|
| Paraffin wax | 60 |
| Carnauba wax | 10 |
| Ester wax | 10 |
| Petroleum resin | 5 |
| Carbon black | 15 |

Formation of Porous Film

A resin component of ingredients for each of Examples 1 to 4 and Comparative Examples 1 and 2 as shown in Table 1 was added to a solvent and dissolved therein by stirring with an agitator (Disper available from ASADA IRON WORKS CO., LTD.) to prepare a resin solution. When a resin was not easily dissolved in the solvent, the resultant mixture was heated up to 50° C. to dissolve the resin. An emulsifier solution was added to the resin solution, and the mixture was stirred for one hour by means of Disper to prepare a W/O emulsion.

The average diameter of water particles in the W/O emulsion was measured by means of a laser diffraction particle size distribution analyzer (SALD-1100 available from Shimadzu Corp.). The result is shown in Table 1.

The heat-meltable ink layer was coated with the W/O emulsion, which was then dried at 45° C. to form a porous film in a coating amount of 0.3 g/m$^2$.

The surface portion of the porous film thus formed was observed at a magnification of ×2000 and at a magnification of ×500 by means of a scanning electron microscope (JSM/T-20 available from JEOL Ltd.) to determine the average pore diameter and the pore density, respectively. The result is shown in Table 1.

The thus prepared intermediate product having the aforesaid porous film was allowed to pass on a hot roll heated to a temperature of 80° C. with the foundation side thereof contacting the hot roll. The surface of the heated product was observed by means of the scanning electron microscope, and the porous film was found to be absent on the surface of the product but it had sunk into the heat-meltable ink layer at a location proximate to the surface thereof.

Evaluation Test

Each of the thermal transfer recording media thus prepared was fitted in a line printer (B-30 available from TEC Corp.). A printing operation was repeated four times on one specific portion of the thermal transfer recording medium under the following printing conditions. The reflective optical density (OD value) of printed images was measured by means of a reflective optical densitometer (Macbeth RD-914) after every printing operation. The result is shown in Table 1.

| Printing Conditions | |
|---|---|
| Thermal head: | Line head type |
| Head pressure: | 1,000 g/inch |
| Printing energy: | 16.8 mJ/mm$^2$ |
| Printing speed: | 4 inch/sec |
| Print receiving paper: | Bar-code label paper (Bekk smoothness: 450 sec) |

TABLE 1

| | Ex. 1 | Ex. 2 | Ex. 3 | Ex. 4 | Com. Ex. 1 | Com. Ex. 2 |
|---|---|---|---|---|---|---|
| Resin solution (parts by weight) | | | | | | |
| Cellulose acetate propionate | | 1.0 | 1.0 | | | |
| Cellulose acetate butyrate | 4.0 | | 1.0 | 5.0 | | |
| Ethyl cellulose | | 4.0 | 3.0 | | | |
| Nitrocellulose | 1.0 | | | | | |
| Phenolic resin | | | | | 5.0 | |
| Methyl methacrylate resin | | | | | | 5.0 |
| Methyl ethyl ketone | 66.0 | 70.0 | 70.0 | 70.0 | 70.0 | 70.0 |
| Aqueous solution (parts by weight) | | | | | | |
| Polyethylene glycol fatty acid ester | 1.0 | 1.0 | 1.0 | 1.0 | 1.0 | 1.0 |
| Water | 28.0 | 24.0 | 24.0 | 24.0 | 24.0 | 24.0 |
| Average particle diameter of water particles in emulsion (μm) | 3.3 | 3.0 | 2.4 | 4.1 | *1 | 15.6 |
| Porous film | | | | | | |
| Average pore diameter (μm) | 3 | 2.5 | 2 | 3.5 | *2 | 11 |
| Pore density (/cm$^2$) | $2.0 \times 10^7$ | $3.0 \times 10^7$ | $2.0 \times 10^7$ | $1.2 \times 10^7$ | | $4.1 \times 10^5$ |
| Density of printed image (OD value) | | | | | | |
| First printing | 1.52 | 1.47 | 1.40 | 1.54 | 2.01 | 1.79 |
| Second printing | 1.43 | 1.39 | 1.31 | 1.41 | — | 0.88 |
| Third printing | 1.29 | 1.30 | 1.25 | 1.23 | — | 0.36 |
| Fourth printing | 1.11 | 1.14 | 1.20 | 1.03 | — | — |

*1: W/O emulsion could not be prepared.
*2: Not porous but uniform coating film was formed.

As can be seen from Table 1, the thermal transfer recording media of Examples 1 to 4 each having a porous film formed by using a W/O emulsion of a cellulosic resin allowed for a high density printing from the first printing operation, with OD values of not less than 1.0 in the first to fourth printing operations.

In Comparative Example 1 in which a phenolic resin was used to prepare a W/O emulsion, on the contrary, the resultant film was not porous, and the ink was almost completely transferred onto the receiving paper in the first printing operation, thereby disabling further printing operation. In Comparative Example 2 in which a W/O emulsion of methyl methacrylate resin was used, the density of printed image obtained by the first printing was high but the densities of printed images obtained by the second and later printing were steeply reduced.

As has been described, the use of a W/O emulsion of a specific cellulosic resin according to the present invention makes it possible to form a porous film having an average pore diameter and a pore density as designed in a heat-meltable ink layer, which provides an excellent multi-printing-adaptive thermal transfer recording medium.

In addition to the materials and ingredients used in the Examples, other materials and ingredients can be used in the present invention as set forth in the specification to obtain substantially the same results.

What we claim is:

1. A method for forming a porous film in a thermal transfer recording medium having a foundation, a heat-meltable ink layer provided on one side of the foundation and the porous film provided in proximity to the surface of the heat-meltable ink layer, the method comprising the steps of:

coating the heat-meltable ink layer with a water-in-oil emulsion comprising at least one resin selected from the group consisting of cellulose acetate, cellulose acetate propionate, cellulose acetate butyrate, ethyl cellulose, nitrocellulose and ethyl hydroxyethyl cellulose; and drying the resultant coating to form a porous film.

2. The method of claim 1, wherein said porous film has an average surface pore diameter of 0.1 to 10 μm and a surface pore density of $1.2 \times 10^6$ to $1.0 \times 10^9$/cm$^2$.

3. The method of claim 1, wherein said porous film is formed in a dried coating amount of 0.1 to 1.5 $g/m^2$.

4. The method of claim 1, which further comprises the step of forming an adhesive layer on said one side of said foundation prior to the formation of said heat-meltable ink layer.

5. A method for preparing a thermal transfer recording medium, comprising the steps of:

providing a heat-meltable ink layer on one side of a foundation;

coating the heat-meltable ink layer with a water-in-oil emulsion comprising at least one resin selected from the group consisting of cellulose acetate, cellulose acetate propionate, cellulose acetate butyrate, ethyl cellulose, nitrocellulose and ethyl hydroxyethyl cellulose;

drying the resultant coating to form a porous film; and heating the heat-meltable ink layer to a temperature not lower than the softening point of the heat-meltable ink layer to allow the porous film to sink into a surface portion of the heat-meltable ink layer.

6. The method of claim 5, wherein said porous film has an average surface pore diameter of 0.1 to 10 $\mu m$ and a surface pore density of $1.2\times10^6$ to $1.0\times10^9/cm^2$.

7. The method of claim 5, wherein said porous film is formed in a dried coating amount of 0.1 to 1.5 $g/m^2$.

8. The method of claim 5, which further comprises the step of forming an adhesive layer on said one side of said foundation prior to the formation of said heat-meltable ink layer.

9. A thermal transfer recording medium prepared by a method comprising the steps of:

providing a heat-meltable ink layer on one side of a foundation;

coating the heat-meltable ink layer with a water-in-oil emulsion comprising at least one resin selected from the group consisting of cellulose acetate, cellulose acetate propionate, cellulose acetate butyrate, ethyl cellulose, nitrocellulose and ethyl hydroxyethyl cellulose;

drying the resultant coating to form a porous film; and heating the heat-meltable ink layer to a temperature not lower than the softening point of the heat-meltable ink layer to allow the porous film to sink into a surface portion of the heat-meltable ink layer.

10. The thermal transfer recording medium of claim 9, wherein said porous film has an average surface pore diameter of 0.1 to 10 $\mu m$ and a surface pore density of $1.2\times10^6$ to $1.0\times10^9/cm^2$.

11. The thermal transfer recording medium of claim 9, wherein said porous film is formed in a dried coating amount of 0.1 to 1.5 $g/m^2$.

12. The thermal transfer recording medium of claim 9, which is prepared by said method further comprising the step of forming an adhesive layer on said one side of the foundation prior to the formation of said heat-meltable ink layer.

* * * * *